Sept. 13, 1960 J. K. McNEILL 2,952,472
HYDRAULIC RAM ATTACHMENTS
Filed Nov. 15, 1956 2 Sheets-Sheet 2

Inventor:
James K. McNeill
By Paul O. Pippel
Atty.

United States Patent Office 2,952,472
Patented Sept. 13, 1960

2,952,472

HYDRAULIC RAM ATTACHMENTS

James K. McNeill, Elgin, Ill., assignor to International Harvester Company, a corporation of New Jersey Filed Nov. 15, 1956, Ser. No. 622,447

8 Claims. (Cl. 280—43.23)

This invention relates to hydraulic ram attachments and more particularly to such attachments for implements adapted to be moved between operating and transport positions or having other operating parts to be moved by power. More specifically the invention concerns novel mounting means for the remotely controlled type of cylinder and piston units utilized with agricultural implements and the like. The invention is particularly adapted for use with implements of the trailing type wherein a hydraulic ram mounted on the implement is supplied with fluid under pressure from a source of power on the tractor or the like by which the implement is propelled.

When a hydraulic ram is mounted upon an implement of the trailing type and is supplied with fluid through flexible hose lines from a tractive vehicle having a power unit for supplying fluid under pressure to the ram, it is customary to mount the ram on the implement frame by means facilitating its removal. In modern farm operations it is customary for a tractor operator to utilize the same hydraulic cylinder and piston unit for any implement which he may attach to a particular tractor. However, manufacturing variations are a common occurrence in implements, and in the attaching elements by which the cylinder is carried upon the implement. Therefore, when the hydraulic ram is taken from one implement and mounted upon another or returned to the original implement, the connecting points at the end of the piston and of the cylinder do not coincide with the connecting elements upon the implement. The operator has previously resorted to altering the position of the piston in the cylinder. However, this adjustment of the piston in the cylinder to conform to the spacing between the connecting elements on the implement supporting structure has been accomplished by trial and error. That is, it has been necessary for the operator to manipulate the fluid controls upon the tractor to advance and retract the piston in the cylinder until the connecting elements of the ram are in proper position with respect to the corresponding elements upon the implement. Where the connecting elements have been fixed considerable time and effort has been consumed in making the attachment.

An object of the present invention is the provision of simple and efficient mounting means facilitating the attachment of a hydraulic ram unit to an implement.

Another object of the invention is the provision of novel means for mounting a hydraulic ram unit upon an implement of the type having a part to be moved from an operating to an inoperative position and held there, wherein considerable tolerance in the length of the ram unit is accommodated by the mounting means therefor.

Previous efforts to solve the problem of facilitating the mounting of a hydraulic ram upon an implement and the detachment thereof have involved the use of extensible members and eccentrics at one or more of the mounting elements on the implement to adjust the positions thereof in accordance with the length of the ram, or a free link has been provided for attachment to the ram so the latter could then be extended or retracted to a position where the link could be attached to the part to be moved. The present invention overcomes the past difficulties by eliminating the need for free links, eccentrics and the like, and providing a range of movement of the piston rod in the cylinder in the connection thereof to the part to be moved.

Other objects and advantages of the invention will become clear from the following detailed description when read in conjunction with the accompanying drawings wherein:

Figure 3 is a view in perspective, somewhat enlarged, of a portion of the ram attachment of this invention;

Figure 1:
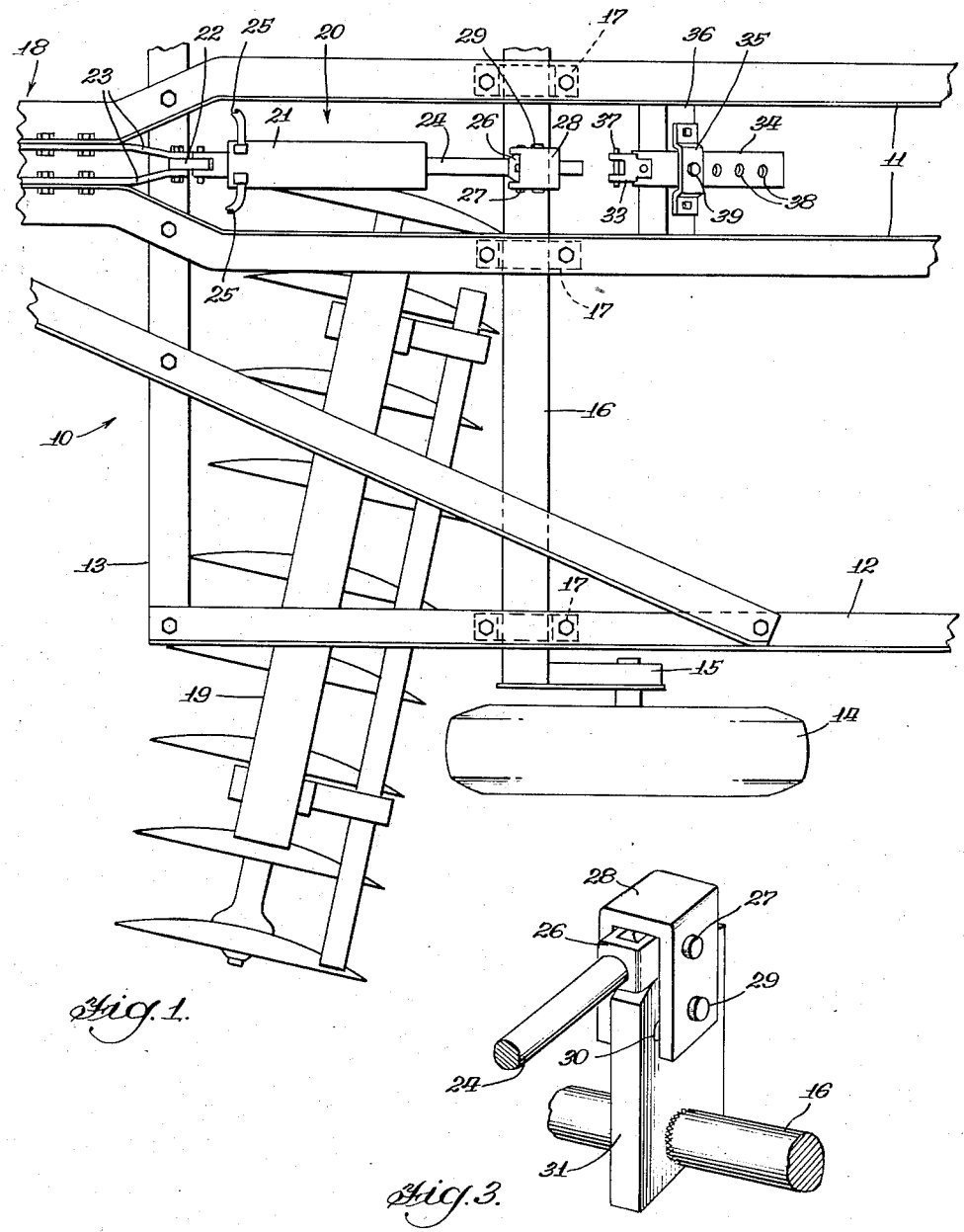
Figure 1 is a plan view of a portion of a tandem disk harrow having a supporting frame upon which is mounted a hydraulic ram attachment incorporating the features of this invention.

In the drawings the numeral 10 designates the frame of a trail-behind implement in the form of a tandem disk harrow, only a portion of which is shown, including centrally disposed longitudinally extending frame bars 11, end bar 12 and a plurality of transversely extending frame bars 13. Only a portion of one-half of the disk harrow is shown, and a single supporting wheel 14 appears in the drawing, although it may be understood that transversely spaced therefrom at the opposite end of the frame is a similar wheel.

Wheel 14 is mounted on a crank arm 15 which, in turn, is affixed to a transversely extending rockshaft 16 rotatably supported in brackets 17. At their forward ends the central frame bars 11 converge and extend forwardly to form a hitch structure 18 adapted for connection at its forward end to a tractor, not shown.

The implement of this invention includes disk gangs 19, only one of which is shown, and is vertically moved between operating and transport positions by rocking the shaft 16 to swing the wheel 14 in a vertical plane, in a manner well known in the art. Rocking of the shaft 16 to raise and lower the implement is accomplished by power operated means in the form of a hydraulic ram 20 comprising a cylinder 21 pivotally anchored to a bracket 22 mounted on the forward transverse frame bar 13 and braced by straps 23.

A piston rod 24 is slidable in the cylinder 20, and it may be understood that fluid under pressure is supplied to the cylinder to extend and retract the piston rod 24 therein through flexible hose lines 25 from a source of fluid under pressure carried on the tractor by which the implement is propelled, in a manner well known in the art.

Figure 2:
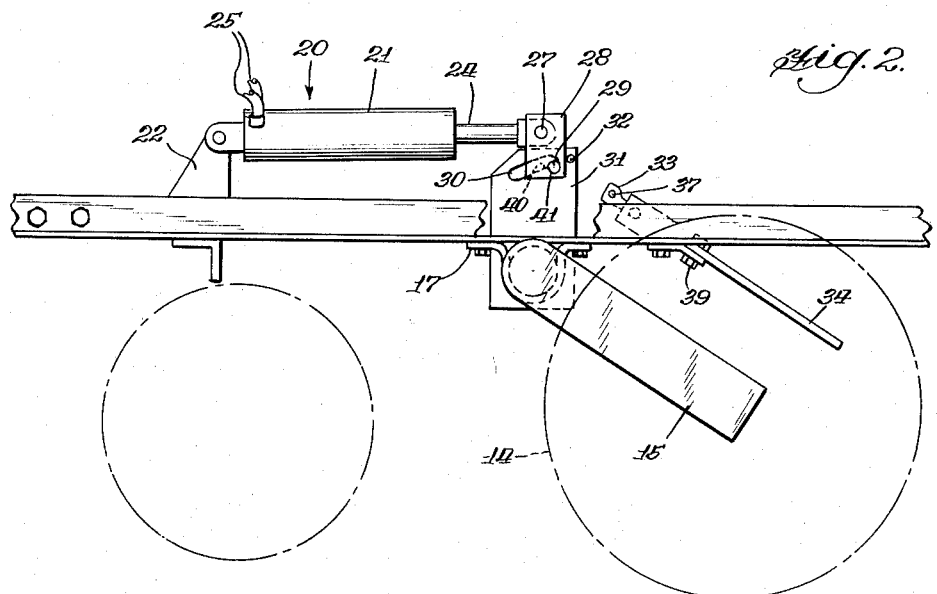
Figure 2 is a schematic view in side elevation, with parts removed, showing the hydraulic ram attachment of Figure 1.

In the form of the invention shown in Figures 1, 2 and 3 the piston rod 24 is provided at its end with a clevis 26 having apertures therein to receive a pin 27, upon which is also mounted an inverted U-shaped member 28 which straddles the clevis 26.

Below pin 27, member 28 is further apertured to receive a transversely extending pin 29 which extends through a slot 30 formed in the upper end of a rock arm 31 affixed to shaft 16 and straddled by the member 28.

Extension and retraction of the rod 24 in the cylinder 21 rocks arm 31 and shaft 16 to raise and lower the implement, extension of the piston rod in the cylinder swinging the wheels 14 downwardly to place the implement in transport position.

It may be observed particularly well in Figure 2 that the length of slot 30 makes it easy to attach the hydraulic ram to the rock arm 31. As pointed out before, a hydraulic ram may be removed from one implement and used on others and later returned to the implement from which it was removed. In order to move the implement from a position such as that shown in Figure 2 to a transport position the piston rod 24 is extended in the cylinder and arm 31 rocked until an opening 32 in the upper end of arm 31 registers with a clevis 33 carried by an adjustable member 34, and the arm 31 pinned thereto. Member 34 slides between a clamp 35 and a brace 36 secured to the frame members 11, and the clevis 33 is provided with a pin 37 for reception in the opening 32. The implement is held in raised position by the member 34 connected by pin 37 to arm 31, member 34 being provided with a plurality of openings 38 to receive a bolt 39 carried by the clamp 35 to hold the implement in a desired raised position.

When the arm 31 is secured to clevis 33 of member 34 the implement is held in raised position and the hydraulic ram 20 may be easily removed simply by withdrawing pin 29 from member 28 and slot 30.

When the hydraulic ram is returned to the implement the cylinder is anchored to bracket 22 and rod 24 is extended or retracted until the lower opening in member 28 registers with some point on the slot 30 so that the pin 29 can be inserted therein. Assuming that the pin 29 is received in the slot 30 at its forward end, the piston rod 24 is simply extended by operating the ram. The lower edge of slot 30, as shown in Figure 2, slopes upwardly to a peak 40 and terminates in a reentrant recess 41 at the rear end of the slot. Thus, upon extension of the rod 24 in the cylinder, pin 29 travels up the lower edge of the slot 30 until it drops over peak 40 into recess 41, whereupon pin 37 may be withdrawn from the opening 32 in the arm 31 and the latter can then be rocked in either direction.

Figure 4:
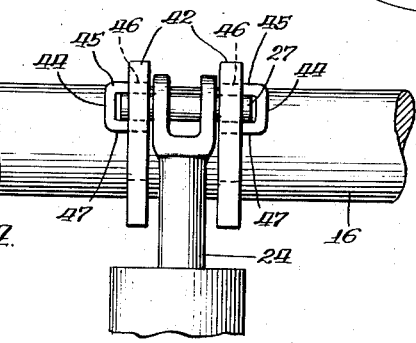
Figure 4 is a detail, enlarged, showing a plan view of a modified form of ram attaching structure embodying the features of this invention.
Figure 5:
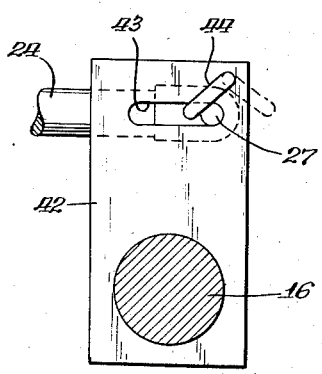
Figure 5 shows the structure of Figure 4 in side elevation.

A modified form of the invention is shown in Figures 4 and 5 wherein a piston rod 24 extends between a pair of laterally spaced arms 42 affixed to the rockshaft 16, and pin 27 carried by the piston rod extends through slots 43, one of which is provided in each of the arms 42. Pin 27 is held in the end of the slot by a U-shaped pin 44 having one arm 45 thereof received in an opening 46 in the upper rear corner of each arm 42, and the other arm 47 of pin 44 is received in the slot 43 to lock pin 27 in the end of the slot. In the dotted line position of Figure 5, pin 44 is freely swinging and serves to lock the implement in raised position as will be explained hereinafter. With the ram 20 in operating position, pin 27 is at the righthand end of the slot 43, as viewed in Figure 5. The operator withdraws arm 45 from opening 46 and reinserts it, simultaneously inserting arm 47 in slot 43 on the side of pin 27 opposite the adjacent end of the slot. Arm 47 engages the upper edge of slot 43 and blocks passage of pin 27 toward the other end of the slot.

In the modified form of the invention shown in Figures 4 and 5 pin 44 is substituted for pin 37 to lock the rock arm 42 to clevis 33 of member 34, pin 44 being moved to the dotted line position of Figure 5 when one of the openings 46 of one of the arms 42 has been advanced into registering position with the opening in clevis 33. The ram unit 20 may then be easily removed.

Figure 6:
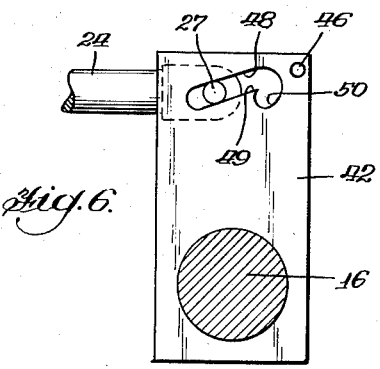
Figure 6 shows another modified form of the invention.

Another form of the invention is shown in Figure 6 wherein the same spaced arms 42 are provided with a slot similar to that shown in Figure 2 and designated by the numeral 48. In this case pin 27 extends through slots 48 in each of the arms 42, rides up to a peak 49 as the piston rod is extended in the cylinder, and drops into a recess 50 at the end of the slot where it is retained so that the arms 42 can be rocked in either direction by extension or retraction of piston rod 24.

It is believed that the operation of the novel hydraulic ram mounting of this invention should be clearly understood from the foregoing description. It should likewise be understood that modifications may be made in the invention without departing from the spirit thereof or the scope of the appended claims.

What is claimed is:

1. Means for mounting a hydraulic ram on an implement having a frame and a part to be moved by the ram to facilitate attachment and removal of the ram, comprising means securing one end of the ram to the frame, and means connecting the other end of the ram to said part for moving the part by the operation of extension and retraction of the ram, said part having an elongated slot therein extending in the direction of operation of the ram, a pin carried by said other end of the ram receivable in said slot, said pin being slidable in said slot by the operation of said ram, and stop means in said slot cooperatively engageable with said pin to limit movement thereon in the slot in either direction and accommodate movement of said part in both directions by operation of the ram, said stop means comprising a reentrant recess in said slot adapted to receive and confine said pin, whereby said part is movable in both directions by the extension and contraction of said ram.

2. The invention set forth in claim 1, wherein said slot is horizontally elongated and the lower edge of said slot upon which said pin rests curves upwardly to the edge of said recess, and said pin moves upwardly along said lower edge and drops into said recess, said recess being approximately the diameter of said pin.

3. In an implement having a frame and a movable part, an arm rockably mounted on the implement so positioned and arranged as to actuate said movable part in response to rocking said arm, means for releasably locking said arm and said movable part to the frame to prevent movement of said part, and power operated means for rocking said arm upon release of said locking means to actuate said movable part, comprising a hydraulic ram anchored at one end to the frame and means releasably connecting the other end of the ram to said arm irrespective of minor variations in the length of the ram, said arm having an elongated slot therein, connecting means extending through said slot and the adjacent end of the ram for connecting the latter to the arm, said ram being extensible and retractable to move said connecting means in said slot, and locking means associated with said arm and cooperable with said connecting means for holding the latter against movement in either direction in said slot, whereby motion is transmitted from the ram to rock said arm in both directions.

4. The invention set forth in claim 3, wherein a recess is provided in one end of said slot adapted to receive said connecting means and hold the latter against movement in either direction relative to said arm.

5. The invention set forth in claim 3, wherein an opening is provided in said arm spaced from one end of said slot, and a stop pin is receivable in said opening and said slot to confine said connecting means therebetween and said end of the slot.

6. In an agricultural implement having a frame, a wheel-carrying shaft rockable to vertically swing the wheels to raise and lower the frame, and means for releasably locking said shaft to the frame to hold the latter in raised position, the combination of an arm affixed to said shaft and rockable to rock said shaft, a hydraulic ram pivotally anchored at one end to the frame, and means connecting the other end of the ram to said arm including means facilitating removal and replacement of the ram, comprising a slot in said arm extending in the direction of extension and retraction of the ram, the adjacent end of said ram having an aperture therein registrable with said slot, a pin insertable in said slot and said aperture engageable with an end of the slot upon operation of the ram to rock said arm in response to operation of the ram in one direction, and means holding said pin at one end of the slot and adapted to transmit the force exerted by the ram to rock said arm in the other direction, the lower edge of said slot being slanted upwardly in one direction of operation of the ram and terminating in a reentrant recess in which said pin is received by gravity upon movement of the latter to the end of the slot by operation of the ram.

7. In an agricultural implement having a frame, a wheel-carrying shaft rockable to vertically swing the wheels to raise and lower the frame, and means for releasably locking said shaft to the frame to hold the latter in raised position, the combination of an arm affixed to said shaft and rockable to rock said shaft, a hydraulic ram pivotally anchored at one end to the frame and means connecting the other end of the ram to said arm including means facilitating removal and replacement of the ram, comprising a straight slot formed in said arm extending in the direction of and parallel to the plane of extension and retraction of the ram, the adjacent end of said ram having an aperture therein registerable with said slot, a pin insertable in said slot and said aperture engageable with an end of the slot upon operation of the ram to rock said arm in response to operation of the ram in one direction, and means holding said pin at one end of the slot and adapted to transmit the force exerted by the ram to rock said arm in the other direction, comprising a locking member carried by said arm engaging said pin on the side thereof opposite one end of said slot to hold it at said one end of said slot.

8. In an agricultural implement having a frame, a wheel-carrying shaft rockable to vertically swing the wheels to raise and lower the frame, and means for releasably locking said shaft to the frame to hold the latter in raised position, the combination of a single arm affixed to said shaft and rockable to rock said shaft, a hydraulic ram pivotally anchored at one end to the frame, and means connecting the other end of the ram to said arm including means facilitating removal and replacement of the ram, comprising a slot in said arm extending in the direction of extension and retraction of the ram, an adapter pivotally connected to the adjacent end of said ram, said adapter having depending legs straddling said arm and having apertures registering with said slot in said arm, a pin insertable in said slot and said aperture engageable with an end of the slot upon operation of the ram to rock said arm in response to operation of the ram in one direction, and means holding said pin at one end of the slot and adapted to transmit the force exerted by the ram to rock said arm in the other direction.

References Cited in the file of this patent
UNITED STATES PATENTS

| 1,271,039 | Kiehler | July 2, 1918 |
| 1,851,449 | Royal | Mar. 29, 1932 |
| 1,981,285 | Rechlicz | Nov. 20, 1934 |
| 2,199,392 | Dabrasky | May 7, 1940 |
| 2,348,445 | Bayer | May 9, 1944 |
| 2,357,556 | Sheldrick | Sept. 5, 1944 |
| 2,392,006 | Silver | Jan. 1, 1946 |
| 2,599,170 | Franks | June 3, 1952 |
| 2,643,893 | Troendle | June 30, 1953 |
| 2,654,302 | Starr | Oct. 6, 1953 |
| 2,668,062 | Drummond | Feb. 2, 1954 |
| 2,672,084 | Forgy | Mar 16, 1954 |
| 2,704,021 | Brundage | Mar. 15, 1955 |
| 2,706,009 | Schramm | Apr. 12, 1955 |
| 2,712,277 | Rutter | July 5, 1955 |
| 2,760,323 | Cooper | Aug. 28, 1956 |
| 2,767,538 | Scheidenhelm | Oct. 23, 1956 |
| 2,778,290 | Greeson et al. | Jan. 22, 1957 |

FOREIGN PATENTS

| 127,852 | Australia | May 26, 1948 |